Nov. 7, 1967  G. R. SHELLEY  3,351,741
DISH-DISPENSING APPARATUS
Filed July 8, 1964  6 Sheets-Sheet 6
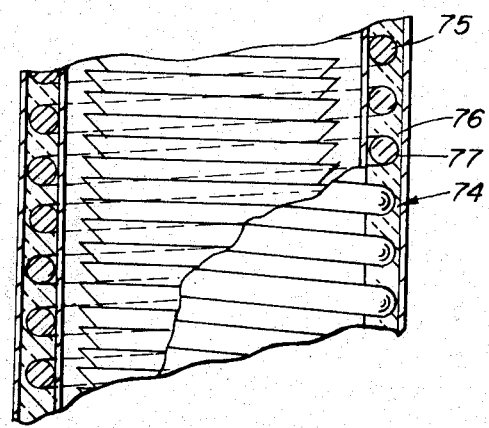
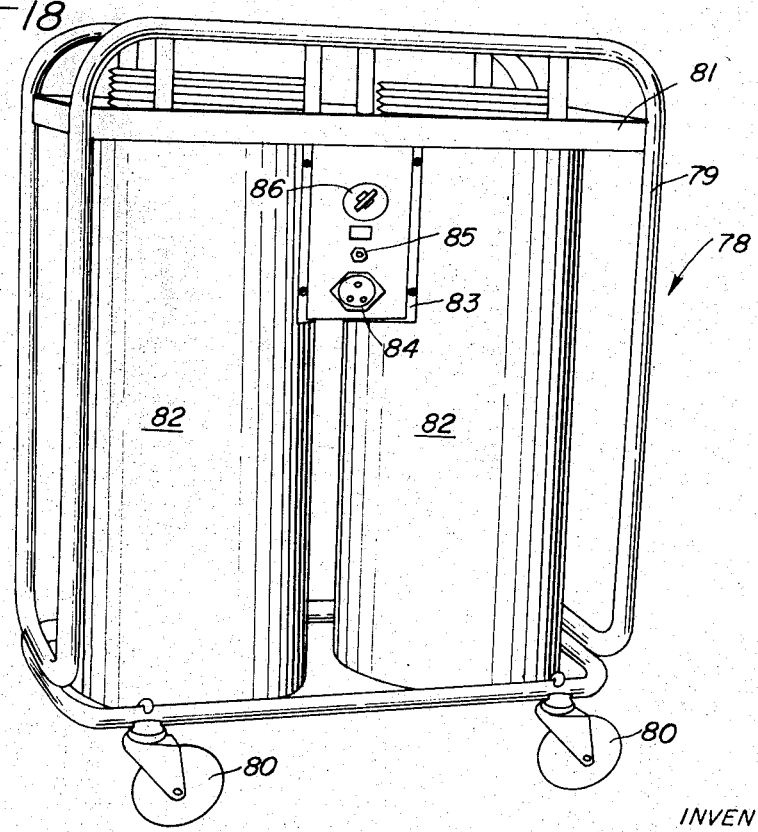
INVENTOR.
GEORGE R. SHELLEY
BY
Charles B. Cannon
ATTY.

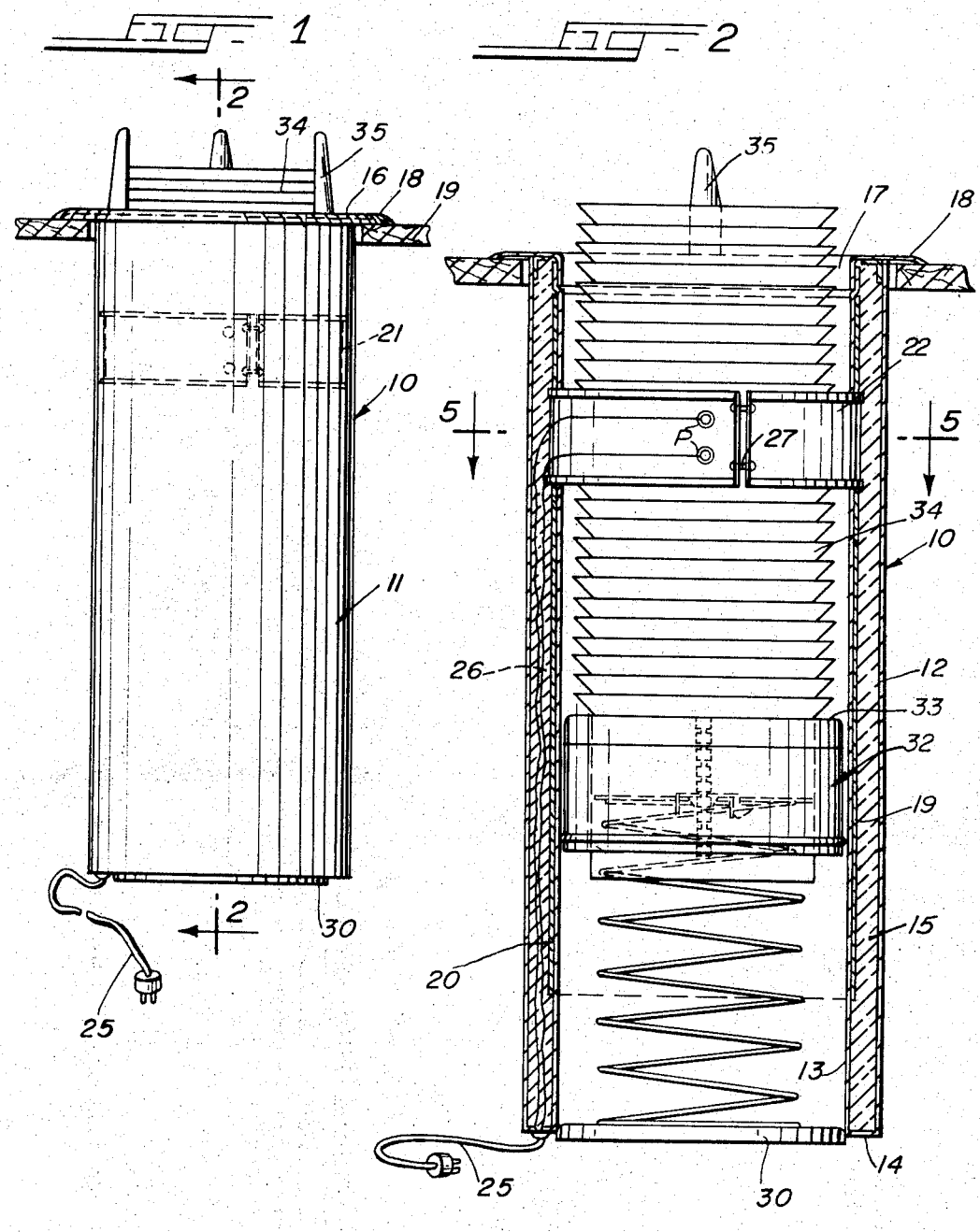

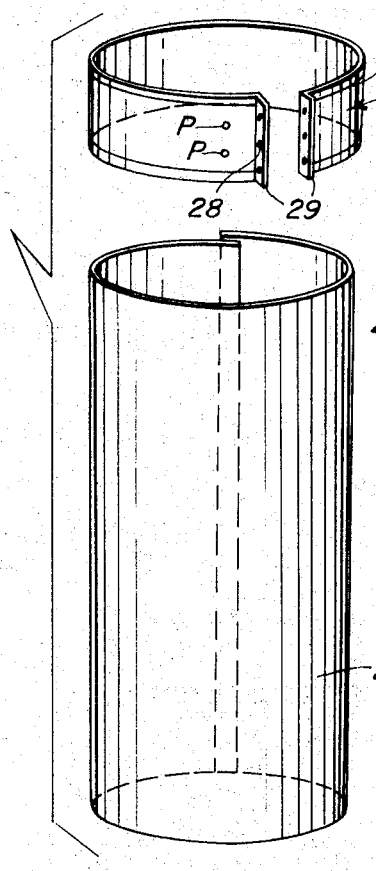
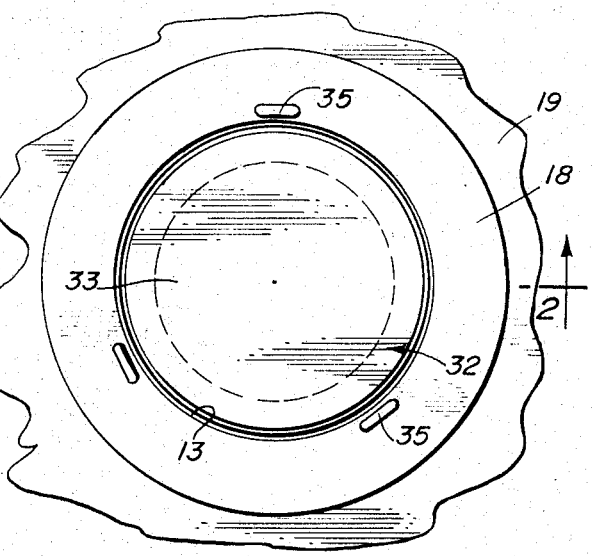
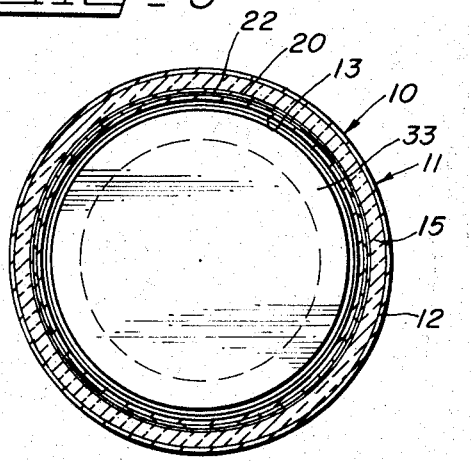
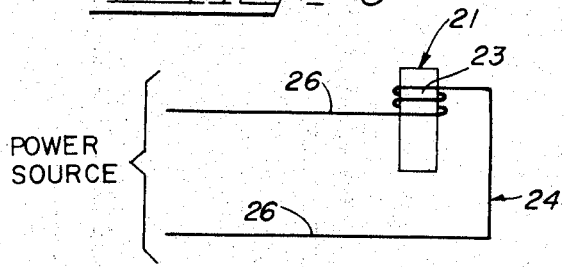
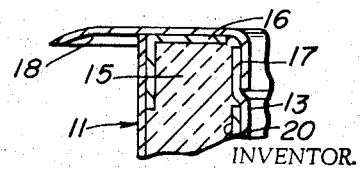
INVENTOR.
GEORGE R. SHELLEY
BY Charles D. Cannon
ATTY.

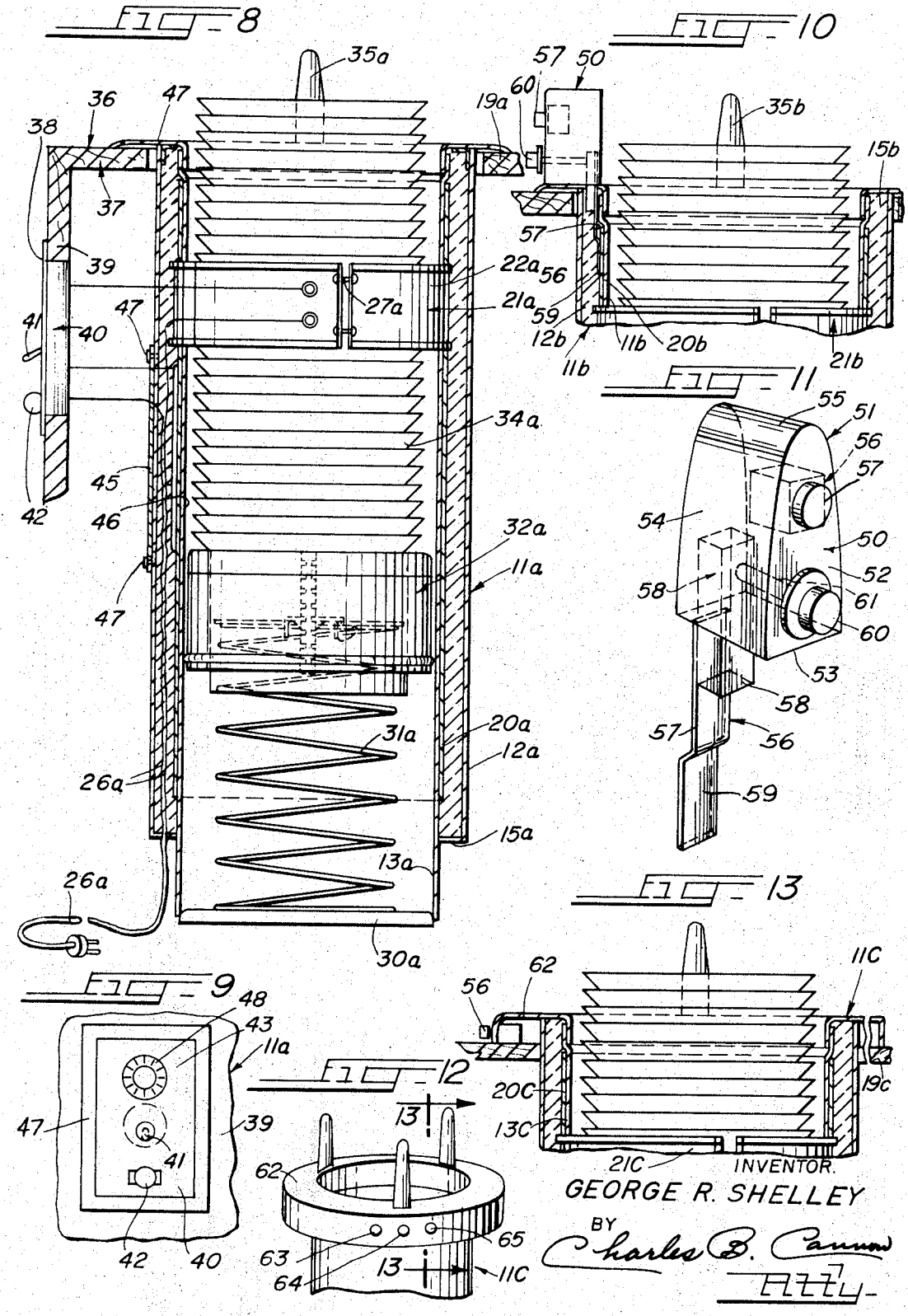

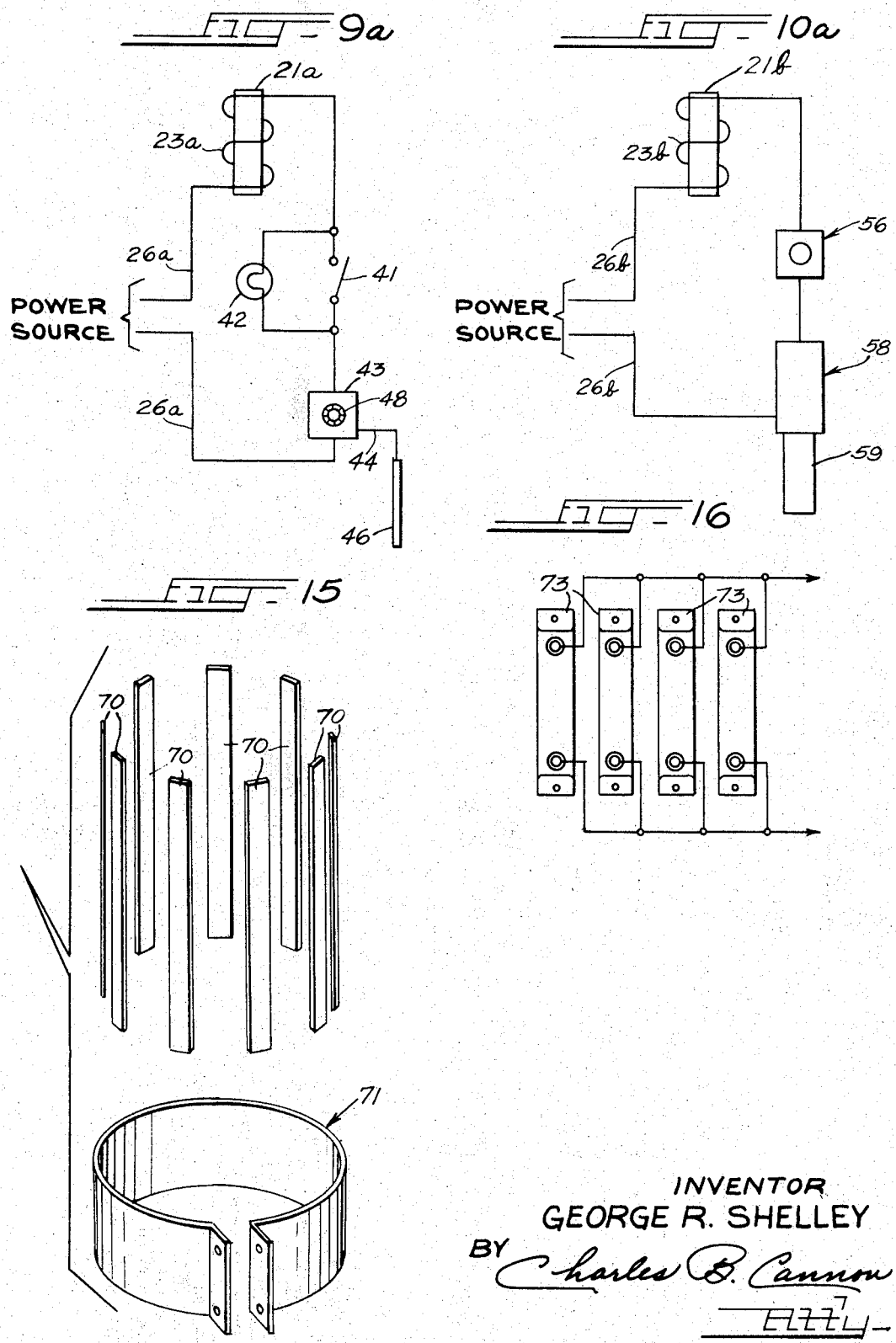

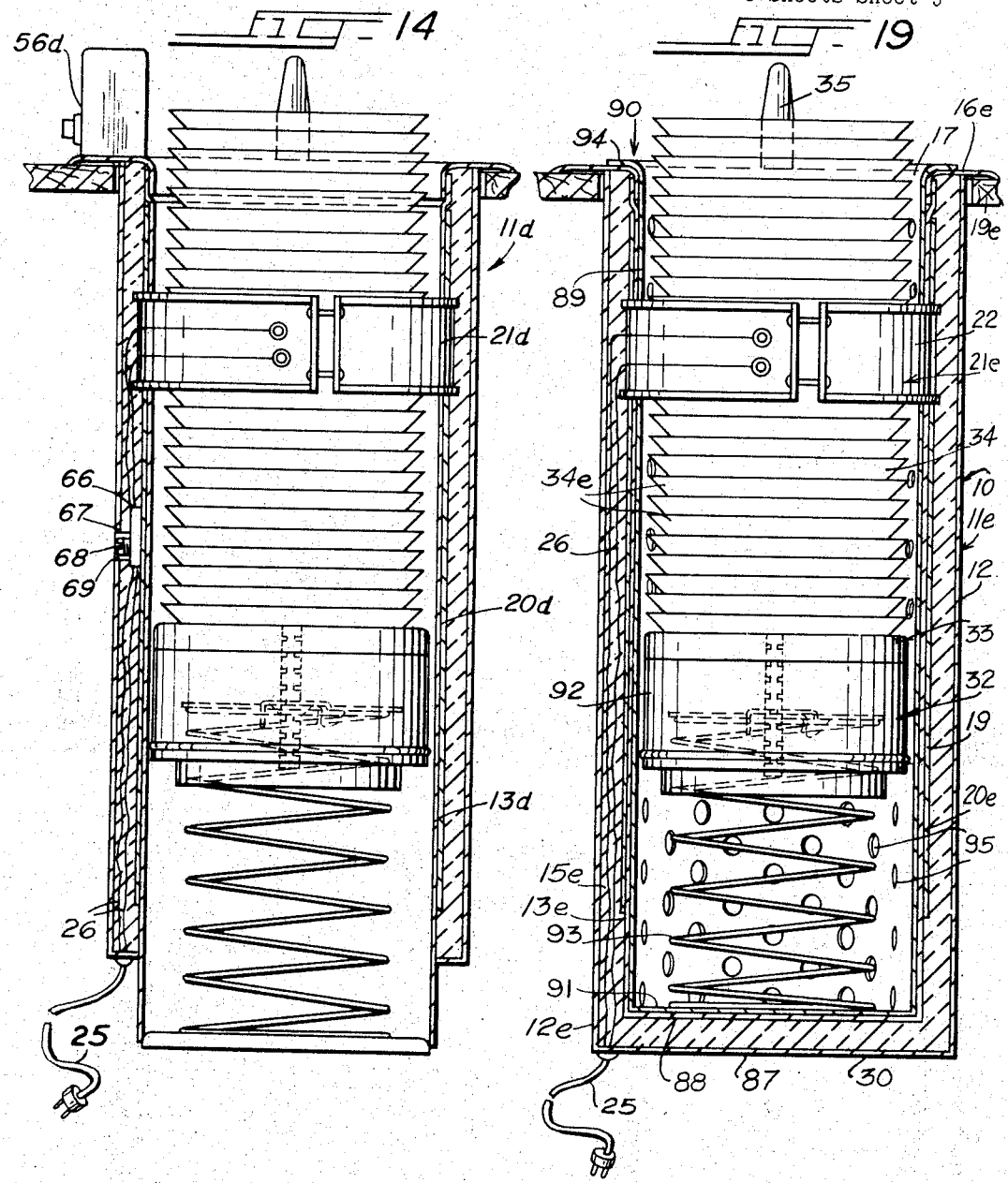

United States Patent Office 3,351,741
Patented Nov. 7, 1967

3,351,741
DISH-DISPENSING APPARATUS
George R. Shelley, South Miami, Fla., assignor to Shelley Manufacturing Company, Miami, Fla., a corporation of Florida
Filed July 8, 1964, Ser. No. 381,148
13 Claims. (Cl. 219—385)

This invention relates to a heated and heat-insulated dish-dispensing apparatus.

In the use of dish-dispensing apparatus, such, for example as used in restaurants, cafeterias, and like places, one of the problems encountered is the fact that the dishes are frequently cold, or become cold on standing, with the result that when hot foods are served thereon, the cold dishes tend to detract from the temperature of the hot meal, and thereby reduce the attractiveness and appetizing character of the meal to the customer.

Heretofore, to heat dishes in a dish-dispensing unit it was necessary to provide an outer heating chamber into which the dish-dispensing unit was placed. In practice, this necessitates expensive special construction to accommodate such heating chamber in the dish-dispensing area of a restaurant or cafeteria. Likewise, such heating chamber devices were bulky, inefficient and costly to operate. Hence, though highly desirable, the use of heated dish-dispensing apparatus was not widespread.

An object of the present invention is to provide a new and improved heated and heat-insulated dish-dispensing apparatus which, in use, overcomes the problems involved in the use of prior dish-dispensing apparatus, and which effectively keeps the dishes warm until such time as they are ready for use in the dispensing of hot meals, or for other purposes.

A further object of the invention is to provide a new and improved heated and heat-insulated dish-dispensing apparatus which is relatively simple and inexpensive in construction but efficient in use.

An additional object of the present invention is to provide a new and improved dish-dispensing apparatus embodying a novel means for maintaining the dish-dispensing unit and the dishes arranged therein in a heated or warm condition.

A further object of the invention is to provide a novel combination switch control unit for the novel heat-conductive metallic unit embodied in the invention and a novel means for mounting the same in position of use on the new heated and heat-insulated dish-dispensing apparatus.

Another object of the invention is to provide a novel heated and heat-insulated portable dish-dispensing apparatus.

It is also an object of the invention to provide a new and improved heated dish-dispensing apparatus wherein, while all the dishes are maintained in heated condition, the heat is concentrated in the dishes adjacent the dish-dispensing zone to subject such dishes to additional heat just prior to use.

Other and further objects will appear hereinafter.

In the drawings:

FIG. 1 is an elevational view illustrating a dish-dispensing apparatus embodying one form of the present invention;

FIG. 2 is an enlarged vertical sectional view on line 2—2 in FIG. 1;

FIG. 3 is a top plan view of the dish-dispensing unit shown in FIGS. 1 and 2;

FIG. 4 is an exploded perspective view illustrating a preferred form of the new heating means which may be embodied in the present invention;

FIG. 5 is a transverse sectional plan view of the heating unit on line 5—5 in FIG. 2;

FIG. 6 is a diagrammatic view schematically illustrating a typical circuit which may be employed for energizing the heating means;

FIG. 7 is an enlarged fragmentary elevational view showing a part of the wall structure and part of the heating unit embodied in the present invention;

FIG. 8 is a vertical sectional view similar to FIG. 2 but illustrating a modification of the invention;

FIG. 9 is a fragmentary elevational view of part of the invention illustrated in FIG. 8;

FIG. 9a is a diagrammatic view schematically illustrating another typical circuit which may be employed for energizing the heating means of the present invention;

FIG. 10 is a fragmentary sectional view, partly in elevation, illustrating another modification of the invention;

FIG. 10a is a diagrammatic view schematically illustrating another typical circuit which may be employed for energizing the heating means of the present invention;

FIG. 11 is a perspective view of the thermostatic temperature control unit embodied in the form of the invention illustrated in FIG. 10;

FIG. 12 is a fragmentary elevational view of another modification of the invention;

FIG. 13 is a fragmentary sectional view on line 13—13 in FIG. 12;

FIG. 14 is a vertical sectional view similar to FIG. 2 but illustrating another modification of the invention;

FIG. 15 is an exploded perspective view of another form of heating means which may be embodied in the present invention;

FIG. 16 is a partial vertical view of a modified form of heating means which may be embodied in the present invention;

FIG. 17 is a partial vertical sectional view illustrating another modified form of heating means which may be embodied in the present invention;

FIG. 18 is a perspective view of a portable dish-dispensing unit embodying the present invention; and FIG. 19 is a vertical sectional view similar to FIG. 2 illustrating another modified form of the present invention.

An embodiment of the new heated and heat-insulated dish-dispensing apparatus is illustrated in FIGS. 1 to 7, inclusive, of the drawings, where it is generally indicated at 10, and comprises a tubular housing 11 which includes an outer wall structure 12 which may be made of any suitable material, such, for example, as galvanized metal, or the like, and an inner tubular wall structure 13 which may also be made of any suitable material such, for example, as stainless steel, or the like, the wall structures 12 and 13 being closed at their lower ends by a bottom wall 14, preferably of like material.

A body of heat-insulating material 15 is arranged between the inner and outer wall structures 12 and 13, as best shown in FIGS. 2 and 5 of the drawings. This heat-insulating material 15 may take various forms such, for example, as high-density Fiberglas, or other suitable insulating materials of similar characteristics.

The tubular wall structure 11, 12, 13 and 14 has an open top which is closed by an annular outwardly extending flange 16 which is formed on the inner tubular metallic wall structure 13 and extends over the upper end portion of the body of heat-insulating material 15 (FIG. 2). In addition an annular cover or cap member 17 is frictionally or othewise fitted into the upper end portion of the inner tubular wall structure 13 and includes a marginal flange portion 17 which extends over and is adapted to rest upon a suitable support such, for example, as a counter top or cabinet top 19, or the like, in which the new heated and heat-insulating unit 10 may be mounted in use.

Apparatus 10 includes a heating means for heating the interior of the tubular housing structure and a stack of dishes disposed therein and supported thereby. To this end a heat-conductive tubular shell or band 20, which may be made of any suitable heat-conductive material such, for example, as aluminum, copper, or other highly heat-conductive metallic or like material, is mounted around and encircles the inner tubular metallic wall member 13, in any suitable manner, as, for example, by being pressed or frictionally fitted thereon, or otherwise secured thereto in heat transfer relationship so that the heat-conductive tubular shell or member 20 lies outside of the inner tubular metallic wall member 13 and is partially embedded in the body of heat-insulating material 15, as shown in FIGS. 2, 5 and 7. The heating means of the present invention embodies the heat-conductive tubular shell or member 20 which has an annular or band-shaped heating unit 21 arranged, in the form of the invention shown, around the upper portion thereof and fastened thereto in a manner which will now be described.

The heating unit 21 may take various forms and in the form shown, embodies a heat-conductive outer aluminized steel shell 22 in which an electrical resistance heating element 23 (FIG. 6), of known design and of suitable characteristics, is arranged. The heating element 23 is arranged within an electrical circuit 24 (FIG. 6) which includes an electrical conductor cord and plug unit 25 (FIG. 2) which is adapted to be connected to any suitable power source such, for example, as an electrical wall outlet of 110–120 v., or the like, and has wires 26 which extend upwardly through the body of the heat-insulating material 15 and are connected to posts P in the electrical heating element 23 within the body 22 of the heating unit 21. The outer heat-conductive metallic shell 22 of the heating unit 21 is adapted to encircle the upper portion of the heat-conductive shell or member 20 on its outer side thereof and may be secured in close heat-transmitting or heat-exchange relationship therewith by inserting suitable fastening elements, such as, screws, bolts, or the like 27, through apertures 28 provided in a pair of matching right-angularly extending flanges 29 which are formed on the end portions of the metallic heat-conductive shell 22 of the heating unit 21 (FIGS. 2 and 4).

The inner tubular member 13 is closed by a bottom wall 30 (FIGS. 1 and 2) and an elevating coil spring 31 is arranged within the inner tubular member 13 and its lower end portion rests on the bottom wall of the inner tubular member 13 (FIG. 2). The elevating coil springs 31 may be of any suitable calibration, and other characteristics, and a dish-supporting and dish-dispensing unit or head 32 of any suitable design and construction rests thereon and is adapted partially to encircle the upper end portion of the elevating coil spring 31. The upper surface or horizontal top wall 33 of the dish-supporting and dish-dispensing unit or head 32 provides a support for a stack of dishes 34 which are adapted to rest thereon and to be urged upwardly by the elevating coil spring 31.

Suitable upwardly extending dish-guide elements 35 are mounted on the annular closure or cap member 16–18 at radial intervals therearound, the use of these dish-guide members 35 being well known in the art.

The dish-supporting and dish-dispensing unit or head 32 may be of any suitable design and construction but a preferred form thereof is disclosed and claimed in co-pending application, Ser. No. 356,121, filed Mar. 31, 1964 in the name of Robert J. Shelley and entitled "Tubular Dish-Dispensing Apparatus."

In the use of the new heated and heat-insulated dish-dispensing apparatus, a stack of dishes 34 may be mounted on the upper surface or the dish-supporting platform 33 of the dish-supporting and dish-dispensing head 32 and the weight thereof will bear down upon the elevating coil spring 31 but, as is well known in the art, the elevating coil spring 31 will maintain the dish-supporting and dish-dispensing unit or head 32 and the stack of dishes 34 in a constantly elevated position so that the dishes 34 will always be readily accessible from the open top of the new dish-dispensing unit 10.

In the use of the new dish-dispensing apparatus 10, as shown in FIGS. 1 to 7, inclusive, of the drawings, the heating unit 21 may be energized by attaching the flexible connector cord and plug unit 25 to a suitable power source, such as a 110–120 v. wall outlet, so as to energize the heating circuit 24 (FIG. 6). When thus energized the heating unit 21 will heat the entire surface of the heat-conductive aluminum shell or member 20 and the thus heated heat-conductive shell or member 20 will transmit heat to the inner metallic tubular wall structure or housing 13, with the result that the air in the inner tubular housing 13 will be heated and the heat therefrom will be transmitted to the stack of dishes 34 so as to maintain the latter in a heated or warm condition so that the dishes 34 will always be warm as and when they are withdrawn for use from the open upper end of the new heated dish-dispensing apparatus 10. Moreover, since the air thus heated within the body of the tubular wall structure will flow upwardly the entire stock of dishes 34 including those which are arranged above the open upper end of the tubular housing structure will be heated and kept in a warm condition at all times.

However, the body of insulating material 15 between the outer tubular metallic wall 12 and the inner tubular metallic wall 13 of the new dish-dispensing apparatus 10 effectively prevents heat transmission through the body of heat-insulating material 15 and thus prevents heat loss and cooling of the new heated dish-dispensing unit 10 with the result that the dishes 34 are always maintained in a warm condition, and will always be warm when withdrawn for serving of hot foods, and for like purposes.

Further, it will be understood that the zone of maximum heat in shell 13 occurs in the portion thereof adjacent heating unit 21. As dishes 34 approach the open top of shell 13, they pass through this zone of maximum heat just prior to dispensing. Thus, such dishes 34 are additionally heated or super-heated so that the dishes 24 being dispensed are in the most heated condition.

A preferred form of the heating unit 21 is of known construction and is manufactured and sold commercially by Acra Independent Electric Company of Franklin Park, Ill., and is known as the Acrawatt unit. Thus, a typical unit of this construction for use with the aluminized steel heating element 20 of 7⅜ inches in diameter has a capacity of 2 watts per square inch of surface, an intake voltage of 115 volts power, and a power output of 154 watts; the required wattage varying in direct ratio to and depending upon the diameter of the tubular heating element 20.

In the use of the present invention, various forms of heating units 21 may be used with the heat-conductive devices may be used in place of the heat-conductive member or shell 20, for heating the new heated and heat-insulated dish-dispensing apparatus 10 as will be described in greater detail hereinbelow.

The modification of the invention illustrated in FIGS. 8 and 9 of the drawings is similar to the form of the invention shown in FIGS. 1 to 7, inclusive, of the drawings and those parts thereof which are the same or similar to corresponding parts in the form of the invention shown in FIGS. 1 to 7, inclusive, have been given the same reference numerals followed by the additional and distinguishing reference character a.

Thus, in the form of the invention illustrated in FIGS. 8 and 9, a combination switch and thermostatic control unit 40 for the heating circuit 21a and thermostatic sensing device for the aluminized steel heating unit 20a is detachably mounted on a vertical wall 39 of the counter top 36 of a counter 37 in which the dish-dispensing unit 11a is mounted, in any suitable manner (FIG. 8).

The combination switch and thermostatic control unit 40 includes an on-off switch member 41, and an on-off indicator light 42 and a thermostatic temperature regulating or sensing device 43 which is connected by a tubular, flexible connector 44 (FIG. 9a) to a temperature sensing bulb or element 46 in contact with heating unit 20a. Regulator 43, connector 44 and sensing element 46 may be of the known bulb-and-bellows type of thermal control device. Regulator 43 includes a temperature adjustment knob or control 48 (FIGS. 9 and 9a), preferably mounted on the front wall 38 of the control unit 40. A closure plate or panel 45 is detachably mounted on the outer wall 12a of the tubular housing 11a as by bolts 47, to provide access to the thermostatic sensing device 43 for repair and replacements.

In the use of the device the temperature of the aluminum heat-conductive member 20a is sensed by the thermostatic sensing device 43 and this information is transmitted to the thermostatic regulating device 43 which controls the current to heating unit 21a in accordance with the temperature setting of adjustment knob 48 while indicator light 42 indicates whether or not the current is flowing through wires 26a to heating unit 21a. The control switch 41 enables the electrical current to the heating unit 21a and to the aluminum heat-conductive member 20a to be readily turned on or off.

Another modification of the invention is illustrated in FIGS. 10 and 11 of the drawings and those parts thereof which are similar or comparable to corresponding parts in the form of the invention illustrated in FIGS. 1 to 7, inclusive, or in the form of the invention illustrated in FIGS. 8 and 9, have been given similar reference numerals followed by additional and distinguishing reference character b.

In the form of the invention for the heating unit illustrated in FIGS. 10 and 11, a combination electrical switch control and thermostatic temperature control and sensing device 50 for the aluminized steel heating unit 20b is provided and includes a housing 51 having a front wall 52, a bottom wall 53, side walls 54, and a top wall 55.

Device 50 includes a push-button on-off switch 56 for controlling the current to heating element 21b. Preferably switch 56 includes a translucent control button 57 of the known type which lights up when switch 56 is actuated to effect flow of current to the heating element 21b. Switch 56 may be similar in construction and operation to a switch commercially available under designation No. 1175 from the Molex Products Co., Brookfield, Ill. To regulate the temperature of element 21b and its associated heating unit 20b and shell 13b, device 50 also includes a thermostatic temperature regulating device 58 having a metallic temperature sensing strip 59 depending therefrom in heat transfer relationship with heating unit 20b. To adjust the temperature regulation of thermostat 58, there is provided therefor an adjustment knob 60 operatively connected to thermostat 58 by shaft 61. Thermostat 58 and its associated element may be of the known bi-metal type of thermal control device.

In the use of the form of the invention illustrated in FIGS. 10 and 11 the combination switch control and temperature control and sensing device 50 may be detachably mounted on the upper end portion of the housing 11b by any suitable means with the depending arm 59 of the thermostat 58 disposed in the housing 11b between the insulating wall 15b and the aluminum heat-conductive member 20b, and in contact with the latter.

In the use of the form of the invention illustrated in FIGS. 10 and 11 the current control to the heating unit 21b may be regulated by the push-button control switch 56 and the temperature of the aluminum heating unit 20b will be sensed by the temperature sensing strip 59 and thus regulating device 58 controls the current passing through wires 26b to heating unit 21b in accordance with the temperature setting of knob 60.

Another modification of the invention is illustrated in FIGS. 12 and 13 of the drawings and those parts thereof which are similar to or correspond to parts of the invention shown in FIGS. 1 to 7, inclusive, or in FIGS. 8 and 9 or FIGS. 10 and 11, have been given the same reference numerals followed by the additional and distinguishing reference character c.

In the form of the invention illustrated in FIGS. 12 and 13, tubular housing 11c is provided with an extended top flange section 62 adapted to rest upon cabinet top 19c and there is mounted in flange 62, as shown, an electrical control switch 63, an indicator light 64 and a suitable thermostatic control unit 65 so as to be readily seen by an accessible to the user. Thermostatic control unit 65 may be of any suitable known type and the switch 63, light 64, and unit 65 are suitably interconnected to heating unit 21c; for example, as shown in FIG. 9a; to control the current thereto and regulate the temperature of shell 13c.

FIG. 14 illustrates another form of the present invention wherein the pre-set thermostatic control unit is mounted in a recess in the side of the tubular housing to prevent tampering therewith by uniqualified personnel. In this modification, those parts thereof which are similar or comparable to corresponding parts in the form of the invention illustrated in FIGS. 1 to 7, inclusive, or FIGS. 8 and 10 have been given similar reference numerals followed by additional and distinguishing reference character d.

In the form of the invention illustrated in FIG. 14, heating unit 21d is in heat-exchange relationship with heat-conductive shell 20d which in turn is in heat-transfer relation with the inner metallic wall 13d of tubular housing 11d.

To control the current to heating unit 21d, there is detachably mounted on the upper end of housing 11d push-button on-off switch 56d. To provide thermostatic regulation of unit 21d, a suitable thermostatic temperature regulating device 66 is mounted in the side of tubular housing 11d as shown. The thermal element of the thermostat temperature regulating device 66 which is in temperature sensing relation with shell 20d may be of any known type, such as, a buld-and-bellows or bi-metal type.

Thermostat 66 is provided with a rotatable temperature adjusting shaft 67 instead of an adjustment knob, shaft 67 being provided with a slot or kerf 68 to accommodate a screw driver or similar tool by means of which shaft 67 may be rotated to vary the temperature control of thermostat 66 and its associated tubular housing 11d.

Switch 56d and thermostat 66 may be suitably interconnected to heating unit 21d; for example, as shown in FIG. 10a to control the current thereto and regulate the temperature of shell 13d.

Thermostat 66 is mounted preferably in the side of tubular housing 11d as shown and beneath the countertop 19d with access to shaft 67 by means of opening 69 in the side of housing 11d. This is to avoid tampering or change in temperature setting of thermostat 66 by other than qualified personnel.

FIG. 15 illustrates a modified form of heating means for use in the present invention. In this form of heating means, tubular shell 20 is replaced by a plurality of spaced heater bars 70 positioned about inner wall 13 of tubular housing 11. Bars 70 which are preferably of aluminum, copper or other similar heat-conducting material are maintained in heat exchange relationship with wall 13 by a heating unit 71 which is preferably similar in construction and operation to heating unit 21 of the embodiment of FIGS. 1–7. However, in the embodiment of FIG. 15, heating unit 71 is adapted to encircle the lower portion of the heat bars 70 in heat transfer relation.

FIG. 16 illustrates another form of heating means for use in the present invention. In this form of heating means, tubular shell 20 and heating unit 21 are replaced by a plurality of, preferably interconnected, strip heater units 73 in heat transfer relationship with wall 13.

FIG. 17 illustrates another form of heating means for use with the present invention. In this form of heating means, shell 20 and heating unit 21 are replaced by an elongated heating element 74 wrapped about wall 13 as shown in heat transfer relationship therewith. Element 74 can be of any known type of direct-contact heating element such as a heating tape, a Calrod unit or the like. As shown, element 74 may include an internal resistor 75 embedded in heat-resisting material such as powdered fused magnesia 76 and enclosed in a cylindrical metal sheath 77 brazed or otherwise secured in heat exchange relation with wall 13, although other suitable forms of conduction heating elements may be employed.

FIG. 18 illustrates a heated and heat-insulated portable dish dispenser unit 1, designated generally 78, embodying the present invention.

Unit 78 includes a tubular dish-dispensing cart 79 mounted for movement on a plurality of spaced casters 80. Cart 79 has a top dispenser mounting surface 81 with a separate opening (not shown) therein to accommodate side-by-side each heated and insulated tubular dish-dispensing apparatus 82 which may be similar in construction and operation to the apparatus 10 of FIGS. 1 to 7, inclusive. While two tubular dish-dispensing units 82 are shown it will be understood that more or less units 82 may be employed as desired by simply varying the size of cart 79.

Preferably, when two or more dispenser units 82 are employed, the controls for each dispenser 82 are interconnected to a common control panel 83 on cart 79 which includes a common electrical power inlet socket 84 to which the electrical connections to the respective heating units of dispensers 82 are connected, a current on-off switch 85 which may, if desired, also include an indicator light such as is incorporated with switch 56 and a thermostat temperature regulating device 86 of any known type as described heretofore for regulating the temperature of each dispenser 82.

In use, unit 78 is rolled to a dish loading area; such as, at the dishwashing apparatus where each dispenser 82 is loaded with its complement of dishes. With dispensers 82 loaded, unit 78 is moved to the dish dispensing zone, which is usually in the food-serving area. An electrical connection is then made between socket 83 and an electrical power source, thermostat 86 is set at the desired dish-dispensing temperature, and switch 85 is actuated to supply current to the heating units of dispensers 82. Thus, it is possible to have a heated dish dispenser quickly and easily at any desired location without special construction.

FIG. 19 illustrates another form of the present invention wherein those parts thereof which are the same or similar to corresponding parts in the forms of the invention hereinbefore described have been given the same reference numerals followed by the additional and distinguishing reference character e.

In the embodiment illustrated in FIG. 19, tubular housing 11e is constructed as heretofore with an outer wall 12e and an inner wall 13e separated by a body of insulating material 15e. In this particular embodiment, however, tubular housing 11e has the lowermost end thereof closed by spaced bottom walls 87, 88 which are formed as bottom wall extensions of walls 12e and 13e, respectively. The bottom walls 87 and 88 are separated by additional insulating material 15e to form a tubular well closed at one end and insulated at the sides and bottom thereof.

As heretofore described tubular housing 11e is heated preferably by means of heat-conductive shell 20e and heating unit 21e in a manner similar to that described in connection with the embodiment of FIGS. 1 to 7, inclusive. In the embodiment shown in FIG. 19, a stack of dishes 34e is supported in a tubular dish-dispensing unit designated generally 90. Unit 90 includes a tubular side wall 89 and is closed by a bottom wall 91 to form a tubular dish-dispensing unit open at its upper end. Unit 90 also includes a dish-supporting head 92 and an elevating coil spring 93 similar in construction and operation to head 32 and spring 31 of the embodiment shown in FIGS. 1 to 7, inclusive. Tubular dish-dispensing unit 90 is provided with an annular outwardly-extending flange 94 at its upper end.

In operation the tubular dish dispenser unit 90 is inserted into the heated tubular housing 11e with the upper flange 94 thereof resting on flange 16e of housing 11e which in turn is supported by the counter top 19e. Preferably tubular dish dispenser 90 is dimensioned to be in direct heat transfer relation with inner wall 13e of housing 11e with the bottom wall 91 of tubular dispenser 90 contiguous with bottom wall 88 of housing 11e. To adapt tubular dish dispenser unit 90 for installations wherein the side walls 89 and the bottom wall 91 thereof are not in direct heat conductive relationship with their counterparts of housing 11e, the side wall 89 of unit 90 is provided with a plurality of spaced perforations 95 to admit warmed air disposed between side walls 89 and 13e into and through tubular dish-dispensing unit 90, warming a stack of dishes 34e therein.

It will thus be seen from the foregoing description, considered in conjunction with the accompanying drawings, that the present invention provides a new and improved heated and heat-insulated dish-dispensing apparatus, having the desirable advantages and characteristics and also accomplishing its intended objects including those hereinbefore pointed out and others which are inherent in the invention.

I claim:

1. A heated dish-dispensing apparatus comprising, in combination, a tubular housing having an open top and including an inner tubular wall member and an outer tubular wall member spaced from each other to provide an intra-wall space having a body of heat-insulating material arranged therein, electrical heating means in the said tubular housing for heating the interior of the said tubular housing structure including a heat-conductive tubular metallic member, the said heating means including a heat-conductive tubular metallic member arranged within the said tubular wall structure and in heat-exchange relationship with the said inner tubular wall member, an electrically energizable heating unit arranged in heat-exchange relationship with the said tubular heat-conductive metallic member for heating the interior of said housing, and a tubular dish-dispensing member having an upper end and adapted to fit within said tubular housing, dish-supporting means within the said tubular dish-dispensing member for supporting a stack of dishes, spring means in the said tubular dish-dispensing member below the said dish-supporting means and having the said dish-supporting means resting thereon, said tubular dish-dispensing member being in heat absorbing relation with said heated tubular housing for heating said stack of dishes therein, said tubular dish-dispensing member being readily adapted for insertion into and removal as a unit from the heated interior of said tubular housing.

2. A dish-dispensing apparatus comprising, in combination, a tubular housing structure having an open top and including an inner tubular wall member and an outer tubular wall member spaced from each other to provide an intra-wall space having a body of heat-insulating material arranged therein; dish-supporting means within the said tubular housing structure for supporting a stack of dishes; spring means in the said tubular housing structure below the said dish-supporting means and having the said dish-supporting means resting thereon; electrical heating means in the said tubular housing for heating the interior of the said tubular housing structure and the said stack of dishes rested on the said dish-supporting means; a combination electrical switch control unit for the said heating unit detachably mounted on the upper end portion of the said tubular housing; and a temperature sensing device for the said heat-conductive metallic member mounted on the said tubular housing.

3. A dish-disposing apparatus comprising, in combination, a tubular housing structure having an open top and including an inner tubular wall member and an outer tubular wall member spaced from each other to provide an intra-wall space having a body of heat-insulating material arranged therein; a heat-conductive tubular metallic member arranged within the said tubular wall structure and in heat exchange relationship with the said inner tubular wall member; dish-supporting means within the said tubular housing structure for supporting a stack of dishes; spring means in the said tubular housing structure below the said dish-supporting means and having the said dish-supporting means resting thereon; electrical heating means in the said tubular housing for heating the interior of the said tubular housing structure and the said stack of dishes rested on the said dish-supporting means; a combination electrical switch control unit for said heating unit; and a temperature-sensing device for the said heat conductive metallic member mounted on the upper end portion of the said tubular housing; the said combination electrical switch control unit for the said heating unit and for the said temperature-sensing device for the said heat-conductive tubular metallic member including a metallic supporting bracket for detachably mounting the said combination electrical switch control unit upon the upper end portion of the said tubular housing; and the said supporting bracket including a depending portion extending into the said tubular housing and in electrical contact with the said heat-conductive tubular metallic member.

4. A dish-dispensing apparatus comprising, in combination, a tubular housing structure having an open top and including an inner tubular wall member and an outer tubular wall member spaced from each other to provide an intra-wall space having a body of heat-insulating material arranged therein; dish-supporting means within the said tubular housing structure for supporting a stack of dishes; spring means in the said tubular housing structure below the said dish-supporting means and having the said dish-supporting means resting thereon; electrical heating means in the said tubular housing for heating the interior of the said tubular housing structure and the said stack of dishes rested on the said dish-supporting means; the said electrical heating means including an elongated electrically-energizable resistance element disposed about said inner tubular wall member and secured in heat transfer relationship therewith; the said resistance element comprising an internal resistor member embedded in heat-resisting material and enclosed in a cylindrical metal sheath; and means securing said cylindrical metal sheath in heat exchange relation to said inner tubular wall member.

5. A dish-dispensing apparatus comprising, in combination, a tubular housing structure having an open top and including an inner tubular wall member and an outer tubular wall member spaced from each other to provide an intra-wall space having a body of heat insulating material arranged therein; dish-supporting means within the said tubular housing structure for supporting a stack of dishes; spring means in the said tubular hosing structure below the said dish-supporting means and having the said dish-supporting means resting thereon, electrical heating means in the said tubular housing for heating the interior of the said tubular housing structure and the said stack of dishes rested on the said dish-supporting means; the said inner tubular wall member being in the form of a heat-conductive tubular metallic wall member; the said heating means including a tubular heat-conductive metallic member encircling the said inner tubular metallic wall member on the outer surface thereof and in heat-exchange relationship therewith; the said heating means including an electrically energizable heating unit in heat-exchange relationship with the said tubular heat-conductive metallic member; the said electrically energizable heating unit comprising an outer metallic shell in heat-exchange contact with the said heat-conductive tubular metallic member and having an electrical heating element arranged therein; control means for said heating unit comprising an electrical control switch for controlling electrical current to said electrical heating element; means mounting said electrical control switch on the upper end portion of said tubular housing for ready access; a thermostatic temperature regulating device for regulating the temperature of said inner metallic wall member and having means for varying the selected temperature setting thereof; means electrically interconnecting said thermostatic temperature regulating device with said electrical heating device for regulating the electrical current thereto in response to a predetermined temperature of said inner metallic wall member sensed by said thermostatic temperature regulating device; means mounting said thermostatic temperature regulating device in the side of said tubular housing structure in said intra-wall space and remote from said switch; and access means in said outer tubular wall member for providing limited access to the temperture varying means of said thermostatic temperature regulating device whereby the location of said thermostatic temperature regulating and remote from said switch; and access means in said outer tubular wall member for providing limited access to the temperature varying means of said thermostatic temperature regulating device whereby the location of said thermostatic temperature regulating device ensures against tampering with the selected temperature setting for said dish-dispensing apparatus.

6. A heated dish-dispensing apparatus comprising, in combination, a tubular housing having an open top and including an inner tubular wall member and an outer tubular wall member spaced from each other to provide an intra-wall space having a body of heat-insulating material arranged therein; electrical heating means in the said tubular housing for heating the interior of the said tubular housing structure including a heat-conductive tubular metallic member; the said heating means including a heat-conductive tubular metallic member arranged within the said tubular wall structure and in heat-exchange relationship with the said inner tubular wall member; and electrically energizable heating unit arranged in heat-exchange relationship with the said tubular heat-exchange metallic member for heating the interior of said housing; a tubular dish-dispensing member having an upper end and adapted to fit within said tubular housing; dish-supporting means within the said tubular dish-dispensing member for supporting a stack of dishes; spring means in the said tubular dish-dispensing member below the said dish-supporting means and having the said dish-supporting means resting thereon; said tubular dish-dispensing member being in heat absorbing relation with said heated tubular dish-dispensing member being readily adapted for insertion into and being removable as a unit from the heated interior of said tubular housing; and the tubular side wall of said tubular dish-dispensing member being provided with foramina to facilitate heating of said stack of dishes within said dish-dispensing member from said tubular housing.

7. A dish-dispensing apparatus comprising, in combination, a tubular housing structure having an open top and including an inner tubular heat-conductive wall member and an outer tubular wall member spaced from each other to provide an intra-wall space having a body of heat-insulating material arranged therein; dish-supporting means within the said tubular housing structure for supporting a stack of dishes; spring means in the said tubular housing structure below the said dish-supporting means and having the said dish-supporting means resting thereon; electrical heating means in the said tubular housing for heating the interior of the said tubular housing structure and the said stack of dishes rested on the said dish-supporting means; the said heating means including a tubular heat-conductive tubular metallic member arranged in heat-exchange contact with the said inner tubular heat-conductive wall member; and the said heating means including an electrically energizable heating unit arranged in heat-exchange relationship with the said tubular heat conductive metallic member.

8. A dish-dispensing apparatus comprising, in combination, a tubular housing structure having an open top and including an inner heat-conductive tubular wall member and an outer tubular wall member spaced from each other to provide an intra-wall space having a body of heat-insulating material arranged therein; dish-supporting means within the said tubular housing structure for supporting a stack of dishes; spring means in the said tubular housing structure below the said dish-supporting means and having the said dish-supporting means resting thereon; electrical heating means in the said tubular housing for heating the interior of the said tubular housing structure and the said stack of dishes rested on the said dish-supporting means; the said heating means including a tubular heat-conductive metallic member encircling the said inner tubular metallic wall member on the outer surface thereof and in heat-exchange relationship therewith; the said heating means including an electrically energizable heating unit in heat-exchange relationship with the said tubular heat-conductive metallic member; and the said electrically energizable heating unit comprising an outer metallic shell in heat-exchange contact with the said heat-conductive tubular metallic member and having an electrical heating element arranged therein.

9. A dish-dispensing apparatus comprising, in combination, a tubular housing structure having an open top and including an inner tubular heat-conductive wall member and an outer tubular wall member spaced from each other to provide an intra-wall space having a body of heat-insulating material arranged therein; dish-supporting means within the said tubular housing structure for supporting a stack of dishes; spring means in the said tubular housing structure below the said dish-supporting means and having the said dish-supporting means resting thereon; electrical heating means in the said tubular housing for heating the interior of the said tubular housing structure and the said stack of dishes rested on the said dish-supporting means; the said heating means including a tubular heat-conductive metallic member encircling the said inner tubular heat-conductive wall member and in heat-exchange relationship therewith; the said heating means including an electrically energizable heating unit in heat-exchange relationship with the said tubular heat-conductive metallic member; and the said electrically energizable heating unit comprising an outer metallic shell in heat-exchange contact with and encircling the upper portion of the said tubular heat-conductive tubular metallic member on the outer surface thereof and having an electrical resistance element arranged therein.

10. A dish-dispensing apparatus comprising, in combination, a tubular housing structure having an open top and including an inner tubular heat-conductive wall member and an outer tubular wall member spaced from each other to provide an intra-wall space having a body of heat-insulating material arranged therein; dish-supporting means within the said tubular housing structure for supporting a stack of dishes; spring means in the said tubular housing structure below the said dish-supporting means and having the said dish-supporting means resting thereon; electrical heating means in the said tubular housing for heating the interior of the said tubular housing structure and the said stack of dishes rested on the said dish-supporting means; the said heating means including a tubular heat-conductive metallic member encircling the said inner tubular heat-conductive metallic wall member and in heat-exchange relationship therewith; the said heating means including an electrically energizable heating unit in heat-exchange relationship with the said tubular heat-conductive metallic member; the said electrically energizable heating unit comprising an outer metallic shell in heat-exchange contact with the said heat-conductive tubular metallic member and having an electrical resistance element arranged therein; and the said dish-dispensing apparatus including an electrical connector element having a portion thereof embedded in the body of the said heat-insulating material and having a portion extending externally of said tubular housing structure for connection to an electrical power source for energizing the said electrical heating unit.

11. A dish-dispensing apparatus comprising, in combination, a tubular housing structure having an open top and including an inner tubular wall member and an outer tubular wall member spaced from each other to provide an intra-wall space having a body of heat-insulating material arranged therein, dish-supporting means within the said tubular housing structure for supporting a stack of dishes; spring means in the said tubular housing structure below the said dish-supporting means and having the said dish-supporting means resting thereon; electrical heating means in the said tubular housing for heating the interior of the said tubular housing structure and the said stack of dishes rested on the said dish-supporting means; and a combination electrical switch control unit for the said heating unit and a temperature-sensing device for the said heat-conductive metallic member mounted on the upper end portion of the said tubular housing.

12. A dish-dispensing apparatus comprising, in combination, a tubular housing structure having an open top and including an inner tubular heat-conductive wall member and an outer tubular wall member spaced from each other to provide an intra-wall space having a body heat-insulating material arranged therein; dish-supporting means within the said tubular housing structure for supporting a stack of dishes; spring means in the said tubular housing structure below the said dish-supporting means and having the said dish-supporting means resting thereon; electrical heating means in the said tubular housing for heating the interior of the said tubular housing structure and the said stack of dishes rested on the said dish-supporting means; said electrical heating means including a plurality of elongated heater bars; means mounting the said heater bars in spaced heat transfer relationship with the said inner tubular heat-conductive wall member; and an electrically energizable heating unit for heating the said elongated heater bars.

13. A dish-dispensing apparatus comprising, in combination, a tubular housing structure having an open top and including an inner tubular heat-conductive wall member and an outer tubular wall member spaced from each other to provide an intra-wall space having a body of heat-insulating material arranged therein; dish-supporting means within the said tubular housing structure for supporting a stack of dishes; spring means in the said tubular housing structure below the said dish-supporting means and having the said dish-supporting means resting thereon; electrical heating means in the said tubular housing for heating the interior of the said tubular housing structure and the said stack of dishes rested on the said dish-supporting means; the said electrical heating means including a plurality of electrically-energizable strip heaters disposed in spaced heat transfer relationship with said inner tubular heat-conductive wall member.

(Other references on following page)

References Cited

UNITED STATES PATENTS

| | | | |
|---|---|---|---|
| 2,851,577 | 9/1958 | Bolds et al. | 219—535 X |
| 3,030,483 | 4/1962 | Rudolph et al. | 221—150 |
| 3,053,600 | 9/1962 | Holloway | 312—236 X |
| 3,190,453 | 6/1965 | Shelley | 312—71 X |
| 3,231,716 | 1/1966 | Van Den Bosch | 219—535 X |

RICHARD M. WOOD, *Primary Examiner.*

C. ALBRITTON, *Assistant Examiner.*

UNITED STATES PATENT OFFICE

CERTIFICATE OF CORRECTION

Patent No. 3,351,741                      November 7, 1967

George R. Shelley

It is hereby certified that error appears in the above numbered patent requiring correction and that the said Letters Patent should read as corrected below.

Column 2, line 70, strike out "which"; column 4, line 25, for "stock" read -- stack --; line 45, for "24" read -- 34 --; lines 57 and 58, strike out "with the heat-conductive devices may be used"; column 6, line 25, for "uniqualified" read -- unqualified --; column 7, line 20, for "1" read -- 10 --; column 9, line 9, for "dish-disposing" read -- dish-dispensing --; line 63, after "heat" insert a hyphen; line 66, for "hosing" read -- housing --.

Signed and sealed this 25th day of February 1969.

(SEAL)
Attest:

Edward M. Fletcher, Jr.                      EDWARD J. BRENNER

Attesting Officer                            Commissioner of Patents